(12) United States Patent
Okuno

(10) Patent No.: US 6,943,533 B2
(45) Date of Patent: Sep. 13, 2005

(54) VOLTAGE CONVERSION CIRCUIT, SEMICONDUCTOR INTEGRATED CIRCUIT DEVICE, AND PORTABLE TERMINAL

(75) Inventor: Tomohisa Okuno, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 64 days.

(21) Appl. No.: 10/758,652

(22) Filed: Jan. 16, 2004

(65) Prior Publication Data

US 2004/0145925 A1 Jul. 29, 2004

(30) Foreign Application Priority Data

Jan. 20, 2003 (JP) ........................................ 2003-011622

(51) Int. Cl.⁷ .......................... G05F 1/652; G05F 1/613
(52) U.S. Cl. ......................... 323/222; 323/901; 323/282
(58) Field of Search .............................. 323/222, 901, 323/908, 223, 282

(56) References Cited

U.S. PATENT DOCUMENTS

| | | | | |
|---|---|---|---|---|
| 6,140,848 A | * | 10/2000 | Harvey | ........................ 327/112 |
| 6,166,562 A | * | 12/2000 | Mita et al. | ..................... 326/83 |
| 6,617,898 B2 | * | 9/2003 | Okuno et al. | ................ 327/172 |
| 6,885,229 B2 | * | 4/2005 | Okuno et al. | ................ 327/172 |
| 2004/0004509 A1 | | 1/2004 | Okuno et al. | |

FOREIGN PATENT DOCUMENTS

WO    WO 02/060042 A1    8/2002

* cited by examiner

*Primary Examiner*—Bao Q. Vu
(74) *Attorney, Agent, or Firm*—Birch Stewart Kolasch & Birch LLP

(57) ABSTRACT

A voltage conversion circuit alternately controls ON/OFF of a PMOS transistor and an NMOS transistor that are provided in series between high voltage power source lines, and outputs a low voltage obtained by causing a filter circuit to smooth an output voltage of each transistor. Further, the voltage conversion circuit uses the output voltage of the filter circuit as a power source of an output pulse signal generating circuit for driving the two transistors. Further, the voltage conversion circuit causes a start-up signal generating circuit to generate a start-up signal for forcing the PMOS transistor to turn ON during a predetermined period on start-up, and causes a switch control circuit to select the start-up signal instead of the pulse signal from the output pulse signal generating circuit, thereby realizing sure start-up.

20 Claims, 14 Drawing Sheets

VOLTAGE CONVERSION CIRCUIT, SEMICONDUCTOR INTEGRATED CIRCUIT DEVICE, AND PORTABLE TERMINAL

This Nonprovisional application claims priority under 35 U.S.C. §119(a) on Patent Application No. 2003/11622 filed in Japan on Jan. 20, 2003, the entire contents of which are hereby incorporated by reference.

FIELD OF THE INVENTION

The present invention relates to a voltage conversion circuit for supplying a power source voltage which is the most suitable for operating an integrated circuit, and relates also to a semiconductor integrated circuit device and a portable terminal each of which is provided with the voltage conversion circuit.

BACKGROUND OF THE INVENTION

Generally, in an integrated circuit for performing a calculation process based on an operation clock, it is necessary to prepare a large design margin, for fear of unevenness in a manufacturing process, variation in a power source, and variation in temperature, so as to enable the integrated circuit to continuously operate in a normal manner. That is, it is necessary to design the integrated circuit so that: even when a delay time is increased by a various kinds of variation and the like, the whole integrated circuit operates within a single clock. In addition, a sufficiently high power source voltage is applied to the integrated circuit so that the integrated circuit operates even when all the conditions are the worst.

However, the large design margin and the high power source voltage prevent the integrate circuit from operating at a high speed and prevent power consumption from being lowered. Then, there is being developed a technique by which an operational condition of the integrated circuit is detected and the power source voltage is controlled so as to provide a minimum power source voltage required in operating the integrated circuit.

FIG. 13 is a diagram schematically showing a structure of a typically conventional voltage conversion circuit 1 which can vary the power source voltage. The voltage conversion circuit 1 is disclosed in U.S. Pat. No. 6,166,562 (Date of Patent: Dec. 26, 2000). As shown in FIG. 13, the voltage conversion circuit 1 includes a duty ratio control circuit 2, a buffer circuit 3, a filter circuit 4, a critical path circuit 5, a delay circuit 6, a true/false evaluation circuit 7, and an adder 8.

The duty ratio control circuit 2 is a circuit for controlling variation of an output voltage from the buffer circuit 3, and includes a counter 11 and a comparator 12. The counter 11 counts each of numbers from 0 to $2^n-1$ (for example, 0 to 63 when n=6) for each cycle of a supplied clock signal (not shown), and transmits thus counted number to the comparator 12 as a signal NA of n bit. Note that, the counted number returns from $2^n-1$ to 0. Further, not only the signal NA but also a signal NB of n bit is inputted from the adder 8 to the comparator 12.

The comparator 12 is a circuit for controlling ON/OFF of a PMOS transistor mp and an NMOS transistor mn that constitute the buffer circuit 3, and the comparator 12 supplies control signals x1 and x2 respectively to gates of the transistors mp and mn. Note that, when the signal NA is 0, the comparator 12 makes voltage levels of the control signals x1 and x2 low, and when the signal NA is equal to the signal NB, the comparator 12 makes the voltage levels of the control signals x1 and x2 high.

In the buffer circuit 3, a first power source voltage (here, VDD) whose level is high is applied to a source of the PMOS transistor mp, and a second power source voltage (here, ground voltage) whose level is low is applied to a source of the NMOS transistor mn. Further, drains of both the transistors mp and mn are connected to each other, and a connection node thereof functions as an output terminal of the buffer circuit 3.

Thus, in case where levels of the control signals x1 and x2 are low, the PMOS transistor mp turns ON, and the NMOS transistor mn turns OFF, so that an output voltage of the buffer circuit 3 is equal to the first power source voltage (VDD). While, in case where levels of the control signals x1 and x2 are high, the PMOS transistor mp turns OFF, and the NMOS transistor mn turns ON, so that the output voltage of the buffer circuit 3 is equal to the second power source voltage (ground voltage). That is, the output voltage of the buffer circuit 3 varies as indicated by a pulsed voltage signal v1 which rises when the signal NA is 0 and drops when the signal NA is equal to the signal NB.

The voltage signal v1 is smoothed by the filter circuit 4 constituted of an inductance 1 and a capacitor c, so as to be an output voltage v2. The output voltage v2 is supplied to internal circuits (not shown) formed on the same substrate, and is used as a driving voltage of the internal circuit. Further, the output voltage v2 is used also as a power source voltage of the critical path circuit 5.

Suppose that: a time in which the PMOS transistor mp constituting the buffer circuit 3 turns ON and the NMOS transistor mn constituting the buffer circuit 3 turns OFF (i.e., a time in which levels of the control signals x1 and x2 are low) is an ON time T1, and a time in which the PMOS transistor mp turns OFF and the NMOS transistor mn turns ON (i.e., a time in which levels of the control signals x1 and x2 are high) is an OFF time T2, it is possible to calculate the output voltage v2 of the filter circuit 4 in accordance with the following expression.

$$v2=(T1/(T1+T2))\times VDD \tag{1}$$

Here, the ON time T1 (numerator of the right side) in the expression indicates a pulse width of the voltage signal v1, and T1+T2 (denominator of the right side) which is a total of the ON time T1 and the OFF time T2 indicates a pulse cycle of the voltage signal v1. That is, in order to control a minimum power source voltage required in operating the integrated circuit in which the output voltage v2 is desired, a ratio of the voltage signal v1's pulse width and pulse cycle (hereinafter, referred to as duty ratio) is controlled.

Then, in the voltage conversion circuit 1 arranged in the foregoing manner, a value of the signal NB inputted from the adder 8 to the comparator 12 is varied, so that the ON time T1 (pulse width) is varied, thereby controlling the duty ratio of the voltage signal v1 outputted from the buffer circuit 3. Thus, it is possible to control the driving voltage (output voltage v2) supplied to the internal circuits. Hereinafter, such duty ratio control system is referred to as a pulse width variation system. Further, as means for setting the signal NB to a most appropriate value, there is adopted a method in which an operation speed of the critical path circuit 5 is detected.

The critical path circuit 5 is a circuit obtained by copying a path circuit whose signal is delayed for the longest time in the internal circuits. As described above, as the power source voltage, the output voltage v2 of the filter circuit 4 is applied to the critical path circuit 5. That is, a driving voltage of each internal circuit to which the power source is supplied is monitored by the critical path circuit 5. Here, the description is given on the assumption that an operable voltage of the critical path circuit 5 is an operable voltage of the internal circuit.

In case where the critical path circuit 5 is operable due to the output voltage v2 of the filter circuit 4, the critical path circuit 5 transmits predetermined data to the true/false evaluation circuit 7. At this time, the data transmitted from the critical path circuit 5 is directly inputted to the true/false evaluation circuit 7, and delay data obtained by causing the delay circuit 6 to delay the data by a predetermined time is also inputted to the true/false evaluation circuit 7.

In case where the data is not directly inputted from the critical path circuit 5 to the true/false evaluation circuit 7, the true/false evaluation circuit 7 judges that the targeted internal circuit does not normally operate, that is, the true/false evaluation circuit 7 judges that the driving voltage of the internal circuit (output voltage v2 of the filter circuit 4) is too low. Then, the true/false evaluation circuit 7 transmits a signal s1, which increases the value of the signal NB so that its increment is only 1 so as to increase the driving voltage v2, to the adder 8.

While, in case where the delay data is inputted to the true/false evaluation circuit 7 via the delay circuit 6, the true/false evaluation circuit 7 judges that the internal circuit normally operates even when the signal is delayed, that is, the true/false evaluation circuit 7 judges that the driving voltage of the internal circuit is too high. Then, the true/false evaluation circuit 7 transmits a signal s2, which decreases the signal NB so that its decrement is only 1 so as to decrease the driving voltage, to the adder 8.

Moreover, the data is directly inputted from the critical path circuit 5 to the true/false evaluation circuit 7. However, in case where the delay data that has passed through the delay circuit 6 is not inputted, the true/false evaluation circuit 7 judges that a most appropriate driving voltage is applied to the targeted internal circuit, so that the true/false evaluation circuit 7 does not transmit the signals s1 and s2.

In case where the signal s1 is inputted from the true/false evaluation circuit 7, the adder 8 supplies a signal, obtained by adding 1 to the present value of the signal NB, to the duty ratio control circuit 2. While, in case where the signal s2 is inputted from the true/false evaluation circuit 7, the adder 8 supplies a signal, obtained by subtracting 1 from the present value of the signal NB, to the duty ratio control circuit 2.

In the voltage conversion circuit 1 arranged in the foregoing manner, the critical path circuit 5, the delay circuit 6, and the true/false evaluation circuit 7 detect the operation speed of the internal circuits to which the power source is supplied, and control the duty ratio of the voltage signal v1 so as to decrease the driving voltage (output voltage v2) of the internal circuits when the detected operation speed is too fast, and so as to increase the driving voltage of the internal circuit when the detected operation speed is too slow.

As described above, the voltage conversion circuit 1, disclosed by U.S. Pat. No. 6,166,562, which uses a circuit for detecting the operation speed of the critical path circuit 5 and the duty ratio control circuit 2, allows the output voltage v2 to vary in a wide range, so that the voltage conversion circuit 1 is useful as a step-down circuit for decreasing a voltage of a general integrated circuit. However, this structure raises such a problem that: a size of a circuit required in controlling the adder 8 or the like which enables the output voltage v2 to vary in a wider range is larger. This results in increase in the size of the whole step-down circuit. As a result, power consumption of the step-down circuit itself is increased.

Further, the counter circuit 11 used to control the duty ratio operates at a frequency 64 times a frequency of the voltage signal v1, so that power consumption of the counter circuit 11 itself is high.

Generally, in case where the power source voltage of the internal circuit is low or a load current is small, the power consumption of the whole integrated circuit is small, so that a ratio of the power consumption of the step-down circuit itself becomes relatively large. Thus, it is necessary to reduce the power consumption of the step-down circuit itself, so that the step-down circuit based on the foregoing technique is disadvantageous in case where the internal circuit is operated by a low power source voltage.

In view of the foregoing points, the present inventors devised a step-down circuit, suitable for lowering the output voltage, whose circuit size and power consumption are reduced. This structure is disclosed in U.S. Pat. No. 6,617,898 B2 (Date of Patent: Sep. 9, 2003). A voltage conversion circuit 21 of U.S. Pat. No. 6,617,898 B2 is shown in FIG. 14. In FIG. 14, the same reference signs are given to members corresponding to members of FIG. 13, and description thereof is omitted.

The voltage conversion circuit 21 supplies the output voltage v2, outputted from the filter circuit 4, as a power source voltage of the output pulse signal generating circuit 22 and the switch timing control circuit 23. Further, the voltage conversion circuit 21 includes not only the output pulse signal generating circuit 22 and the switch timing control signal 23, but also the buffer circuit 3, the filter circuit 4, and step-up level shifters 24 and 25.

The output pulse signal generating circuit 22 is constituted of the reference pulse signal generating circuit 26, the delay circuit 27, and the delay time control circuit 28. Not the external power source voltage VDD but the output voltage v2 of the filter circuit 4 is supplied to each of the circuits 26, 27, and 28 of the output pulse signal generating circuit 22 and the switching timing control circuit 23 as a power source voltage.

However, when the switch timing control circuit 23 is driven by the output voltage v2 transmitted from the filter circuit 4, each of high level control signals Φ1 and Φ2 for respectively driving the transistors mp and mn corresponds to the output voltage v2, so that a trouble may occur in controlling ON/OFF of the transistors mp and mn. Then, in order to increase voltage levels of the control signals Φ1 and Φ2 to necessary levels, the step-up level shifters 24 and 25 are provided on output stages of the switch timing control circuit 23.

In this manner, all the circuits except for the switch circuit 3 and the filter circuit 4 are driven by the output voltage v2 lower than the external power source voltage VDD, so that it is possible to largely reduce the power consumption of the voltage conversion circuit 21 itself, and it is possible to reduce the power consumption of the whole integrated circuit.

According to the foregoing conventional technique, it is necessary to operate the voltage conversion circuit so as to obtain the output voltage v2, but the existing structure raises such a problem that an output voltage suitable for operating circuits cannot be necessarily obtained on start-up without fail.

SUMMARY OF THE INVENTION

The object of the present invention is to realize a voltage conversion circuit whose circuit size and power consumption are reduced, and to provide (i) a voltage conversion circuit which realizes sure start-up, (ii) a semiconductor integrated circuit device and (iii) a portable terminal each of which has the voltage conversion circuit.

In order to achieve the foregoing object, the voltage conversion circuit of the present invention includes: a switch circuit arranged so that a series circuit constituted of a P-type transistor and an N-type transistor is provided between a pair of power source lines in series; a smoothing circuit for smoothing an output voltage derived from a junction of the P-type transistor and the N-type transistor of the switch circuit; a pulse signal generating circuit for generating one or more pulse signals, each of which has a duty ratio for obtaining a desired output voltage, by using the output voltage smoothed by the smoothing circuit as a power source, so as to give the pulse signal to a control terminal of the P-type transistor and a control terminal of the N-type transistor; a start-up control signal for generating a control signal which forces the P-type transistor to turn ON and giving the control signal to the control terminal of the P-type transistor during a predetermined period on start-up.

According to the arrangement, during a predetermined period on start-up, the start-up control circuit forces the P-type transistor to turn ON, so that an output voltage of the smoothing circuit is increased without fail. Thus, the pulse signal generating circuit which uses the output voltage as its power source begins operating without fail, thereby obtaining a desired output voltage.

Thus, it is possible to realize the voltage conversion circuit whose circuit size and power consumption are reduced by using the output voltage of the smoothing circuit as a power source of the pulse signal generating circuit, and it is possible to realize sure start-up suitable for reducing the output voltage by means of the start-up control circuit.

For a fuller understanding of the nature and advantages of the invention, reference should be made to the ensuing detailed description taken in conjunction with the accompanying drawings.

DESCRIPTION OF THE EMBODIMENTS

The following description will explain one embodiment of the present invention with reference to FIG. 1 to FIG. 7.

Figure 1:
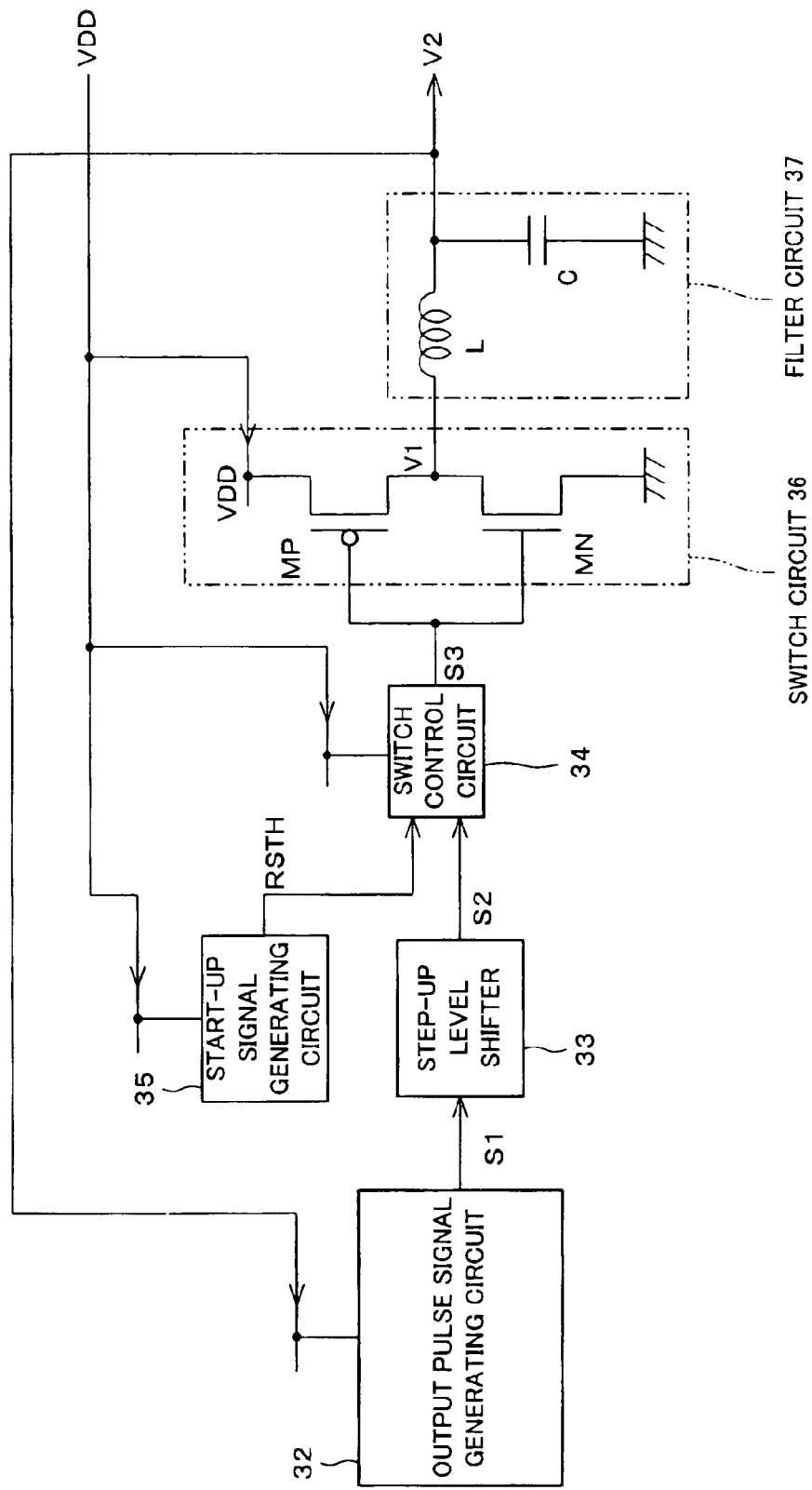
FIG. 1 is a block diagram showing an electric structure of a voltage conversion circuit of one embodiment of the present invention.

FIG. 1 is a block diagram showing an electric structure of a voltage conversion circuit 31 of one embodiment of the present invention. The voltage conversion circuit 31 is a step-down circuit, provided in a semiconductor integrated circuit installed in a portable terminal or the like, which decreases a power source voltage VDD supplied from the outside so that the power source voltage VDD corresponds to a power source voltage v2 of an internal circuit. Roughly, the voltage conversion circuit 31 includes an output pulse signal generating circuit 32, a step-up level shifter 33, a switch control circuit 34, a start-up signal generating circuit 35, a switch circuit 36, and a filter circuit 37.

The output pulse signal generating circuit 32 is a circuit for generating a pulse signal S1 having a desired duty ratio DR as described later, and the pulse signal S1 is inputted to the step-up level shifter 33. The step-up level shifter 33 is a circuit for converting the pulse signal S1 having an amplitude of the power source voltage V2 into a pulse signal S2 having an amplitude of the power source voltage VDD. The switch control circuit 34 receives the pulse signal S2 outputted from the step-up level shifter 33 and a control signal RSTH outputted from the start-up signal generating circuit 35 described later, and selects one of the two input signals in accordance with whether the voltage conversion circuit 31 is in a start-up state or in an ordinary state.

As in the conventional switch circuit 4, the switch circuit 36 includes a PMOS transistor MP and an NMOS transistor MN that are provided in series between a pair of power source lines. The switch circuit 36 amplifies a signal selected by the switch control circuit 34, and outputs thus selected signal to the filter circuit 37. A source terminal of the PMOS transistor MP is connected to the external power source VDD, and a source terminal of the NOMS transistor MN is grounded (GND). A signal S3 outputted from the switch control circuit 34 is commonly inputted to gate terminals of the transistors MP and MN, and each drain terminal functions as an output terminal so as to output a pulsed voltage signal V1.

The voltage signal V1 given to the one terminal of an inductance L provided in the filter circuit 37. The other terminal of the inductance L outputs the output voltage V2 as an output terminal, and a capacitor C is provided between the ground GND and the other terminal. The output voltage V2 is supplied to internal circuits. Thus, when the PMOS transistor MP turns ON, the NMOS transistor MN turns OFF, so that a voltage from the external power source voltage VDD is outputted to the output terminal, and magnetic energy is stored in the inductance L. While, when the PMOS transistor MP turns OFF, the NMOS transistor turns ON, so that the magnetic energy stored in the inductance L is outputted via the NMOS transistor MN. The capacitor C smoothes the output voltage V2.

When a signal obtained by amplifying the pulse signal S2 is inputted from the switch control circuit 34 as the signal S3, the PMOS transistor MP and the NMOS transistor MN alternately turn ON/OFF. Further, a voltage signal V1 of the output is smoothed by the filter circuit 37, thereby obtaining a desired internal power source voltage V2. Thus, the filter circuit 37 functions as a low pass filter (hereinafter, referred to as LPF). Here, an LC circuit is used as the LPF. Of course, an RC circuit may be used.

The start-up signal generating circuit 35 of the present embodiment is a circuit for generating a reset signal of the voltage conversion circuit 31 as described later, and outputs the reset signal to the switch control circuit 34 as the control signal PSTH. The reset signal forces the PMOS transistor MP to turn ON during a predetermined period on start-up.

Thus, the output voltage V2 of the filter circuit 37 rises on start-up without fail, so that the output pulse signal generating circuit 32 which uses the output voltage V2 as its power source begins operating without fail, thereby obtaining the desired output voltage V2. Thus, it is possible to use the output voltage V2 of the filter circuit 37 as a power source of the output pulse signal generating circuit 32. As a result, it is possible to realize the voltage conversion circuit 31 whose circuit size and power consumption are reduced, and it is possible to ensure the start-up suitable for decreasing the output voltage V2 by means of the start-up signal generating circuit 35.

Figure 2:
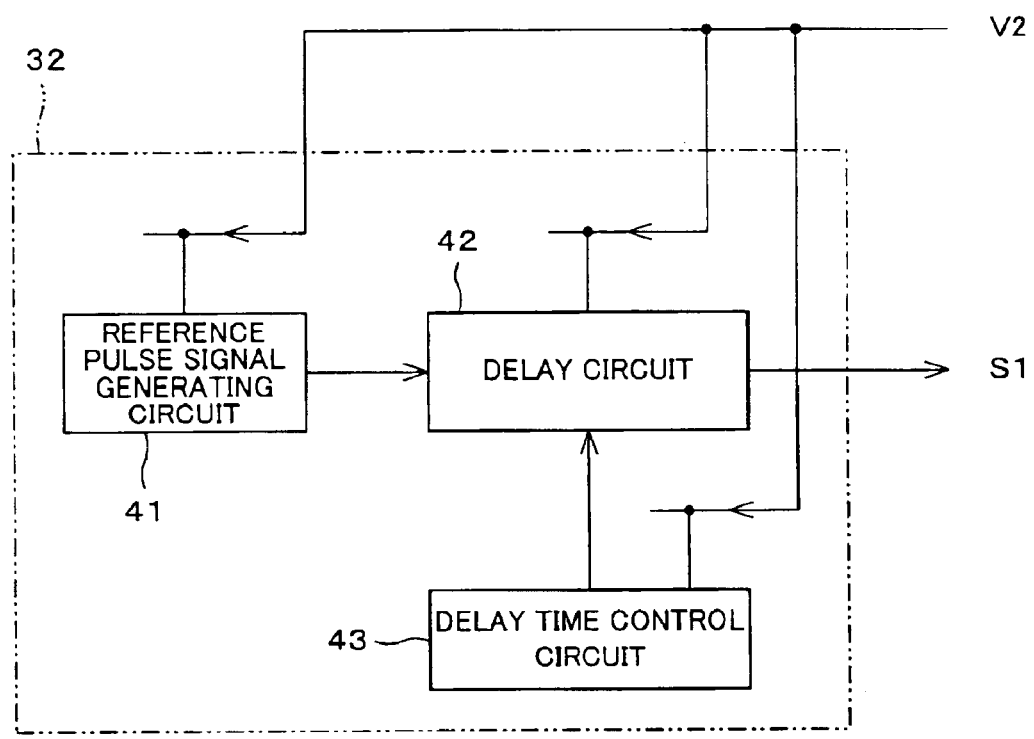
FIG. 2 is a block diagram showing a specific example of how an output pulse signal generating circuit is arranged in the voltage conversion circuit shown in FIG. 1.

FIG. 2 is a block diagram showing a specific example of how the output pulse signal generating circuit 32 is arranged. The output pulse signal generating circuit 32 includes a reference pulse generating circuit 41, a delay circuit 42, and a delay time control circuit 43.

The reference pulse generating circuit 41 is a circuit for generating a reference pulse signal having a constant pulse width in accordance with the output voltage V2 so as to transmit thus generated reference pulse signal to the delay time control circuit 43. The delay circuit 42 is a circuit for generating a delay pulse signal which delays from the reference pulse signal by a predetermined time. The delay time control circuit 43 is a circuit for transmitting a selection signal to the delay circuit 42 so as to set a delay time of the delay circuit 42 so that it is possible to obtain the desired output voltage V2. Details of these circuits are the same as in circuits disclosed in U.S. Pat. No. 6,617,898 B2.

In this manner, the output pulse signal generating circuit 32 includes the reference pulse signal generating circuit 41, the delay circuit 42, and the delay time control circuit 43. Thus, the output pulse signal generating circuit 32 is realized by small circuits, so that it is possible to reduce the power consumption of the voltage conversion circuit 31 itself.

The output pulse signal generating circuit 32 uses a method of varying a cycle of a pulse signal so that a pulse width is constant, i.e., the output pulse signal generating circuit 32 uses a so-called pulse frequency modulation method as a method of generating a pulse signal having the duty ratio DR. However, it is also possible to use a pulse generating circuit based on a method of varying a pulse width of a pulse signal so that a pulse cycle is constant, i.e., based on a so-called pulse width modulation method.

Figure 3:
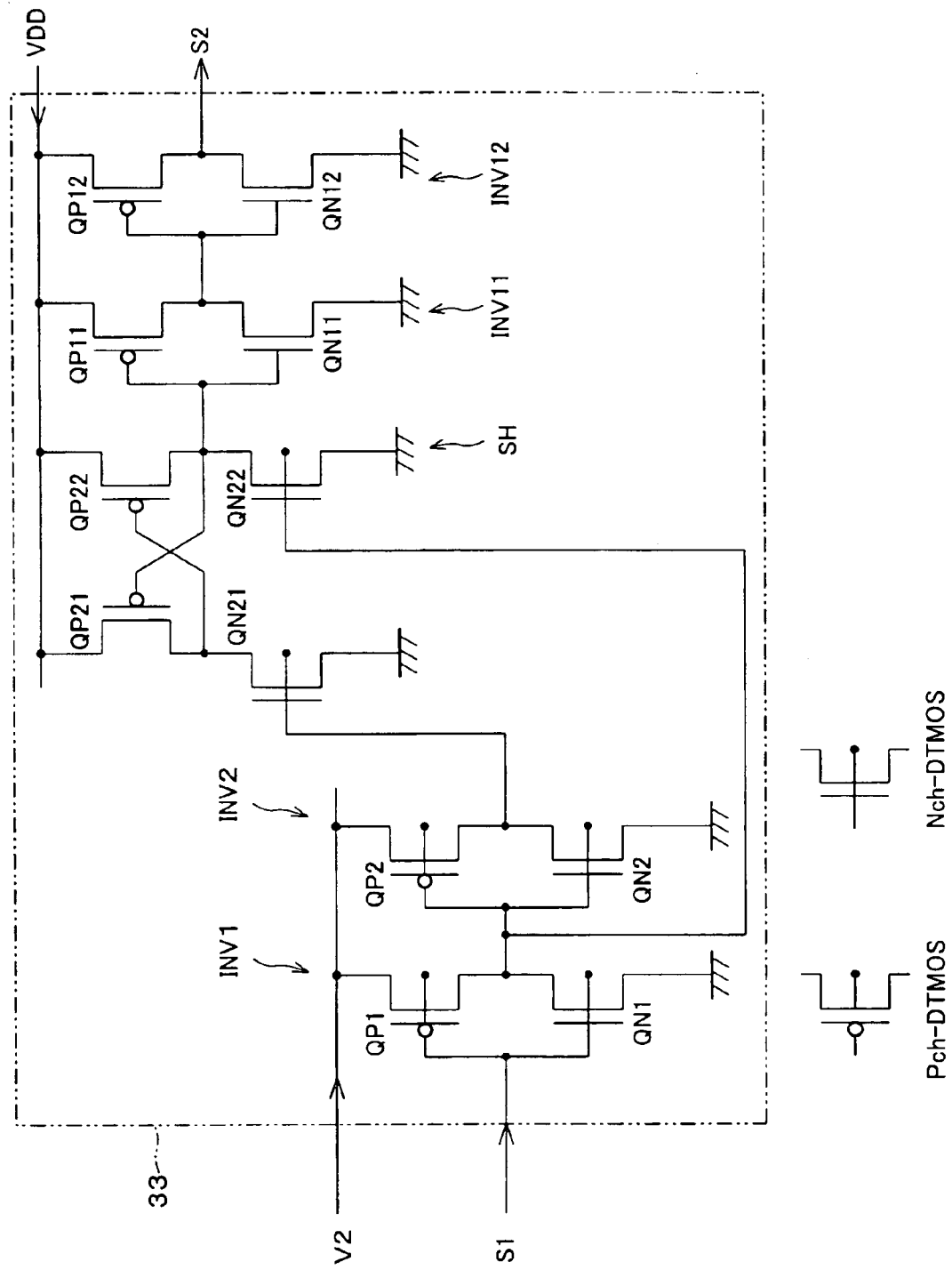
FIG. 3 is a block diagram showing a specific example of how a step-up level shifter is arranged in the voltage conversion circuit shown in FIG. 1.

FIG. 3 is a block diagram showing a specific example of how the step-up level shifter 33 is arranged. Here, a DTMOS (Dynamic Threshold MOS) as a transistor constituting a low-voltage-side circuit. The DTMOS transistor is operated by a power source voltage of approximately 0.5V. Thus, the DTMOS transistor is used to manufacture the integrated circuit, so that the power consumption is reduced as described above. Also in the output pulse signal generating circuit 32, the DTMOS transistor is likewise used as a low-voltage-operating device. Of course, it is possible to use any device as the low-voltage-operating device.

The step-up level shifter 33 includes two-staged inverters INV1 and INV2, a level shifter SH, and two-staged inverters INV1 and INV2.

Each of the inverters INV1 and INV2 is an inverter which uses the output voltage V2 of the filter circuit 36 as its power source, and both the inverters INV1 and INV2 sequentially invert the pulse signal S1, corresponding to the duty ratio DR, which has been outputted from the output pulse signal generating circuit 32. Thus, the inverter INV1 is arranged so that: a series circuit of a PMOS transistor QP1 and an NMOS transistor QN1 is provided between power source lines of the output voltage V2. The pulse signal S1 is given to a base of the transistors QP1 and QN1, and a drain thereof functions as an output terminal, thereby deriving an inversion output whose phase is opposite to the pulse signal S1. Likewise, the inverter INV2 includes a PMOS transistor QP2 and an NMOS transistor QN2. An output of the inverter INV1 is given to a gate of the transistors QP2 and QN2, thereby deriving a normal output whose phase is the same as the pulse signal S1.

The level shifter SH uses the power source voltage VDD as its power source, and amplifies an output from the inverters INV1 and INV2 so that the output corresponds to the power source voltage VDD, so as to output thus amplified output. Thus, the level shifter SH is arranged so that: (i) a series circuit of a PMOS transistor QP21 and an NMOS transistor QN21 and (ii) a series circuit of a PMOS transistor QP22 and an NMOS transistor QN22 are provided in parallel to each other so as to be positioned between power source lines of the power source voltage VDD, and a drain connection end positioned on one end is connected to a gate of the PMOS transistor positioned on another side (a drain of the NMOS transistor QN21 is connected to a gate of the PMOS transistor QP22, and a drain of the NMOS transistor QN22 is connected to a gate of the PMOS transistor QP21). Each of the NMOS transistors QN21 and QN21, the PMOS transistor QP1 and the NMOS transistor QN1 that constitute the inverter INV1, and the PMOS transistor QP2 and the NMOS transistor QN2 that constitute the inverter INV2, is constituted of the DTMOS transistor. An output of the inverter INV1 is given to the gate of the NMOS transistor QN22, and an output of the inverter INV2 is given to the gate of the NMOS transistor QN21, so that each drain of the transistors QP22 and QN22 functions as an output terminal. Thus, an output, having the same phase as the pulse signal S1, which has been level-shifted is derived.

Each of the inverters INV11 and INV12 is an inverter which uses the power source voltage VDD as its power source, and the inverters INV11 and INV12 sequentially invert an output from the drain of the transistors QP22 and QN22. Thus, the inverter INV11 is arranged so that: a series circuit of the PMOS transistor QP11 and the NMOS transistor QN11 is provided between power source lines of the power source voltage VDD. An output of the level shifter SH is given to a gate of the transistors QP11 and QN11, so that a drain thereof functions as an output terminal. Likewise, the inverter INV12 includes a PMOS transistor QP12 and an NMOS transistor QN12. An output of the inverter INV11 is given to a gate of the transistors QP12 and QN12, and a drain thereof outputs the pulse signal S2 which is a normal output signal having the same phase as the pulse signal S1.

In order to reduce the circuit size and the power consumption, the output voltage V2 of the filter circuit 37 is used as a power source of the output pulse signal generating circuit 32 so that the output pulse signal generating circuit 32 is operated by a low voltage. Thus, the pulse signal S2 outputted by the step-up level shifter 33 is increased, so that it is possible to operate the two transistors MP and MN without fail.

Figure 4:
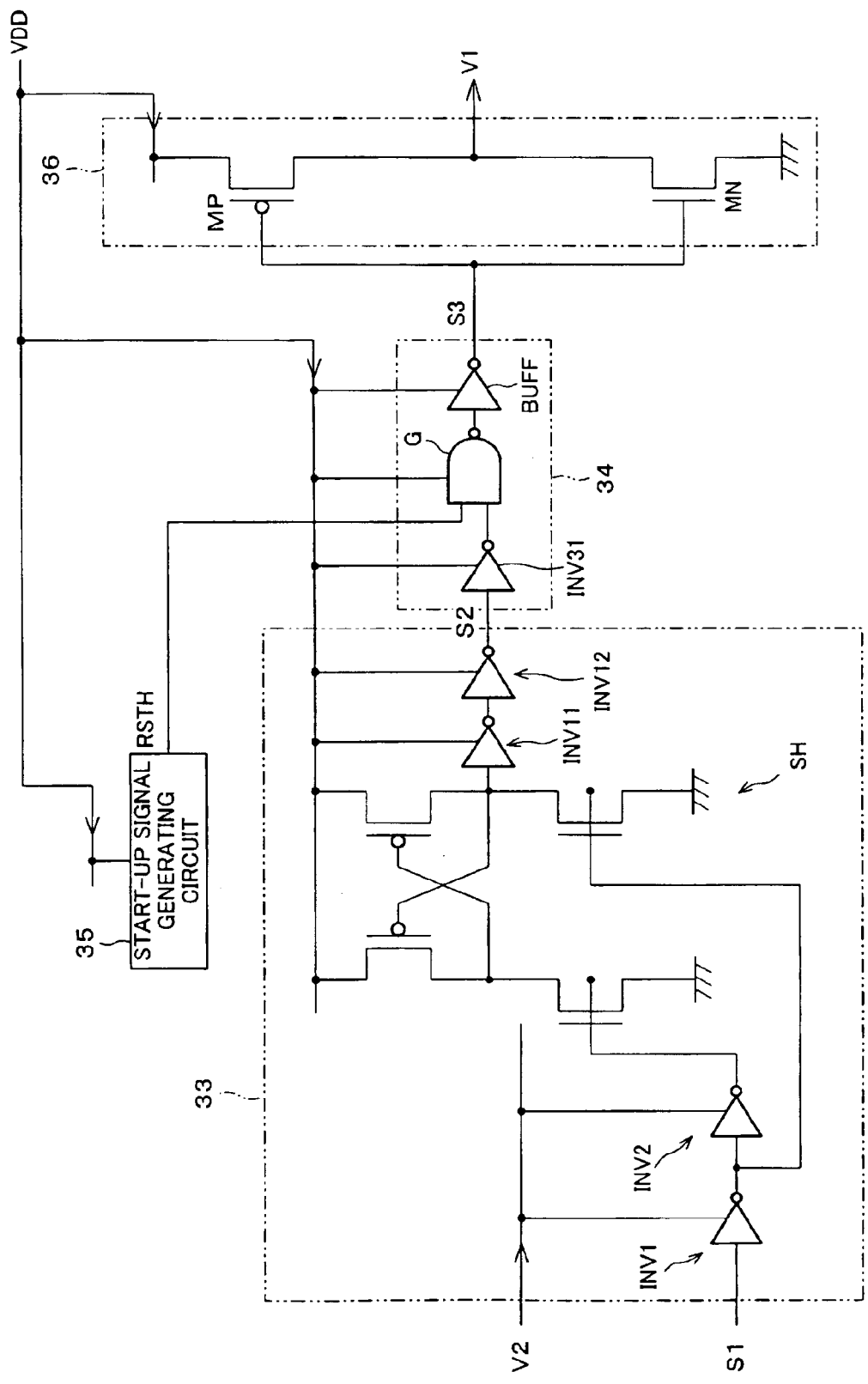
FIG. 4 is a block diagram showing a specific example of how a switch control circuit is arranged in the voltage conversion circuit shown in FIG. 1.

FIG. 4 is a block diagram showing a specific example of how the switch control circuit 34 is arranged. The switch control circuit 34 includes: an inverter INV31 for receiving the pulse signal S2 outputted from the step-up level shifter 33; a NAND circuit G for receiving an output signal of the inverter INV31 and the control signal RSTH of the start-up signal generating circuit 35 as input signals; and a buffer circuit BUFF for driving the gate. The output signal of the inverter INV31 and the control signal RSTH are inputted to the NAND circuit G.

When a level of the control signal RSTH is equal to the VDD level, the NAND circuit G outputs the pulse signal S2 of the output pulse signal generating circuit 32 without any modification. On the other hand, when the level of the control signal RSTH is equal to the GND level, the NAND circuit G outputs the VDD level regardless of the pulse signal S2.

The output signal of the NAND circuit G is inverted by the buffer circuit BUFF constituted an inverter, and its current drivability is enhanced by the buffer circuit BUFF, so that thus inverted signal is outputted as a signal S3. The signal S3 drives a gate of the PMOS transistor MP and the NMOS transistor MN.

Figure 5:
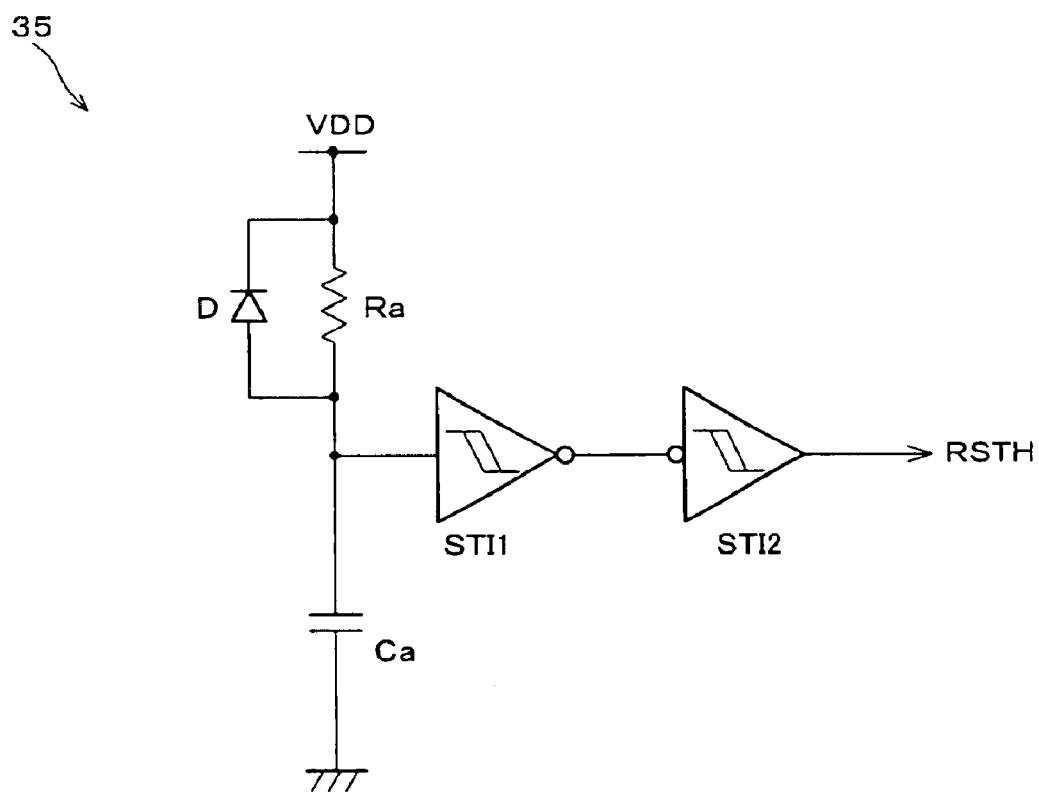
FIG. 5 is a block diagram showing a specific example of how a start-up signal generating circuit is arranged in the voltage conversion circuit shown in FIG. 1.

FIG. 5 is a block diagram showing a specific example of how the start-up signal generating circuit 35 is arranged. This shows a circuit which causes an output to have the GND level during a period corresponding to the RC time constant after the power source voltage VDD has risen. That is, a series circuit of a resistor Ra and a capacitor Ca is provided between power source lines of the power source voltage VDD, and a charging voltage of the capacitor Ca is outputted via schmitt trigger inverters ST11 and ST12 as the control signal RSTH. The diode D is provided in parallel to the resistor Ra, and discharges the capacitor Ca when the power source is turned OFF.

Thus, the start-up signal generating circuit 35 constitutes a power-on-reset circuit. Further, a reset period Trsth in which a level of the control signal RSTH is low is determined by a time constant of the resistor Ra and the capacitor Ca.

Figure 6:
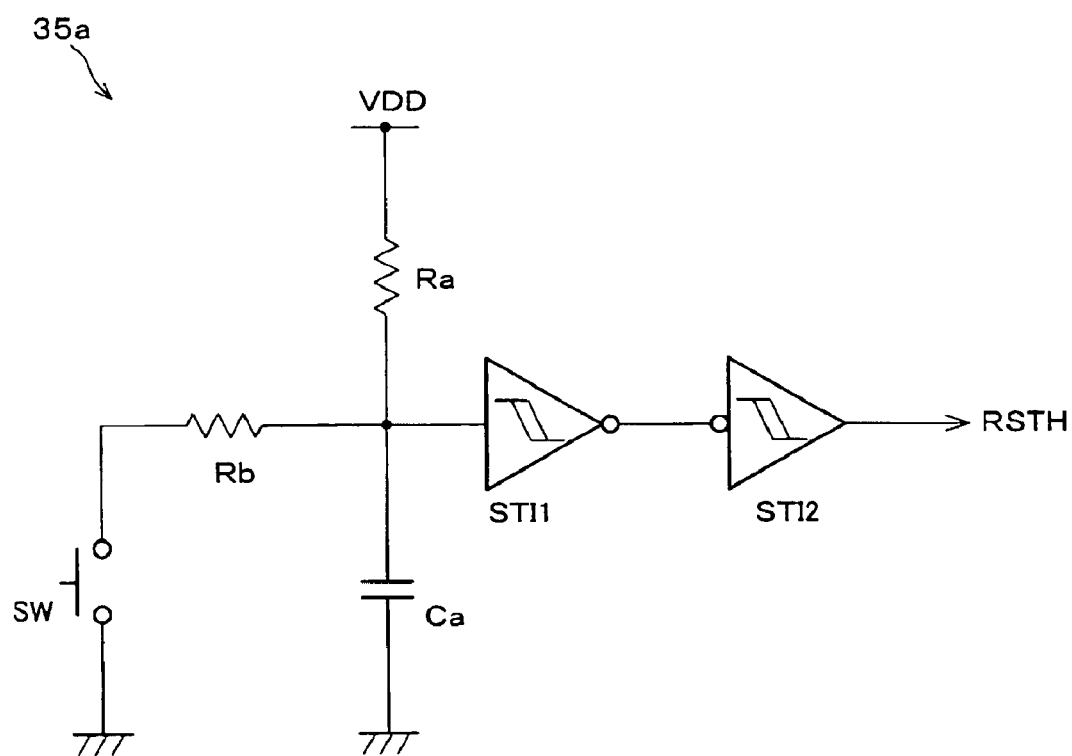
FIG. 6 is a block diagram showing another example of how the start-up signal generating circuit is arranged in the voltage conversion circuit shown in FIG. 1.

Further, FIG. 6 shows a start-up signal generating circuit 35a which is arranged differently from the start-up signal generating circuit 35. The start-up signal generating circuit 35a is a manual reset circuit which is reset by means of a switch SW. When the switch SW is turned ON, electric charge of the capacitor Ca is discharged via the resistor Ra. Thereafter, the start-up signal generating circuit 35a outputs a low level during the reset period Trsth determined by the time constant of the resistor Ra and the capacitor Ca.

In this manner, it is possible to realize a structure for controlling the start-up by making such simple structure having the start-up signal generating circuit 35 and the switch control circuit 34.

Note that, as the start-up signal generating circuit 35, it is possible to use not only the RC circuit shown in FIG. 5 and FIG. 6 but also any circuit such as a timer circuit and a combination of an oscillator and a counter circuit.

Figure 7:
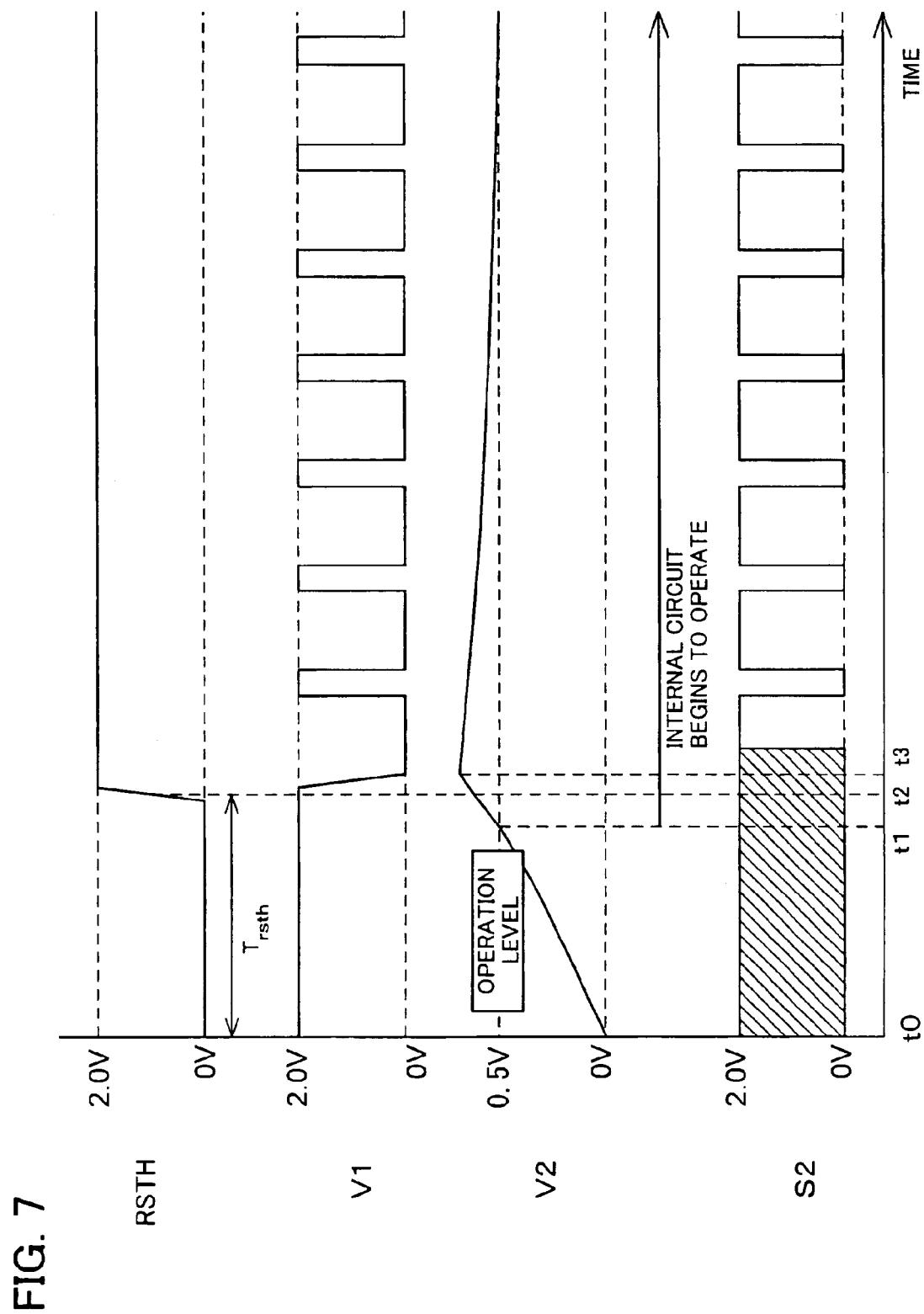
FIG. 7 is a wave form chart for illustrating how the voltage conversion circuit of FIG. 1 operates.

FIG. 7 is a wave form chart for illustrating how the voltage conversion circuit 31 arranged in the foregoing manner operates. FIG. 7 shows that: in normal operation after a time t3, the PMOS transistor MP and the NMOS transistor MN are alternately turned ON/OFF on the basis of the pulse signal S1, having the duty ratio DR, that has been generated by the output pulse signal generating circuit 32. Further, the voltage signal V1 of the output is smoothed by the filter circuit 37, and the desired output voltage V2 for the internal circuit is obtained, and the output voltage V2 is supplied as a power source voltage of the output pulse signal generating circuit 32.

Next, operations on start-up are described as follows with reference to a wave form chart of a main signal that is shown in FIG. 7. On start-up, the output voltage V2 is 0V, so that the output pulse signal generating circuit 32 does not operate. While, the power source voltage VDD begins flowing to the switch control circuit 34 and the start-up signal generating circuit 35 at a time t0 when the power source is turned ON, so that the output pulse signal generating circuit 32 begins operating. Thus, a level of the control signal RSTH outputted from the start-up signal generating circuit 35 becomes low which indicative of "reset", so that a level of the output signal S3 of the switch control circuit 34 becomes the GND level during the reset period Trsth until a time t2. During this period, the output voltage V2 of the filter circuit 37 continues to rise. When the output voltage V2 reaches a level which allows the output pulse signal generating circuit 32 to operate at t1, the output pulse signal generating circuit 32 begins operating.

When the control signal RSTH passes the reset period Trsth, the output voltage V2 gradually drops at t3. However, the output pulse signal generating circuit 32 and the step-up level shifter 33 continue to operate, so as to sequentially output the pulse signal S1. As a result, when the output signal S3 of the switch control circuit 34 is a pulse signal having the duty ratio DR, the voltage conversion circuit 31 stably operates.

In this manner, the start-up signal generating circuit 35 and the switch control circuit 34 are used, so that the voltage conversion circuit 31 starts up without fail. Further, the voltage conversion circuit 31 can continuously operate due to the output voltage V2, so that it is possible to suppress the power consumption of the voltage conversion circuit 31.

In FIG. 7, an operational level of the internal circuit is set to 0.5V. This is because the internal circuit is constituted of the aforementioned DTMOS. Thus, in case of using other device, it is needless to say that the operational level is differently set.

Figure 8:
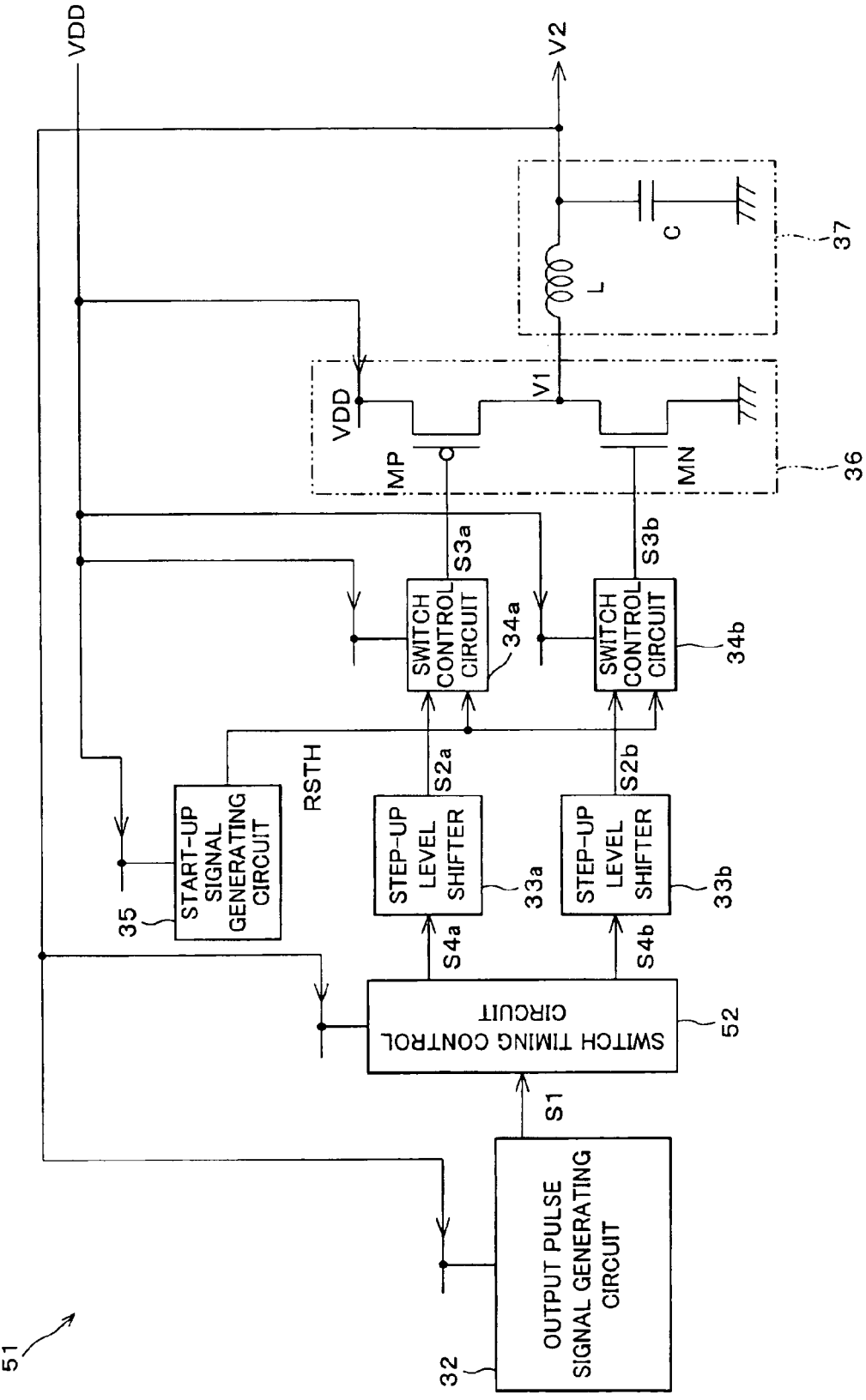
FIG. 8 is a block diagram showing an electric structure of a voltage conversion circuit of another embodiment of the present invention.
Figure 9:
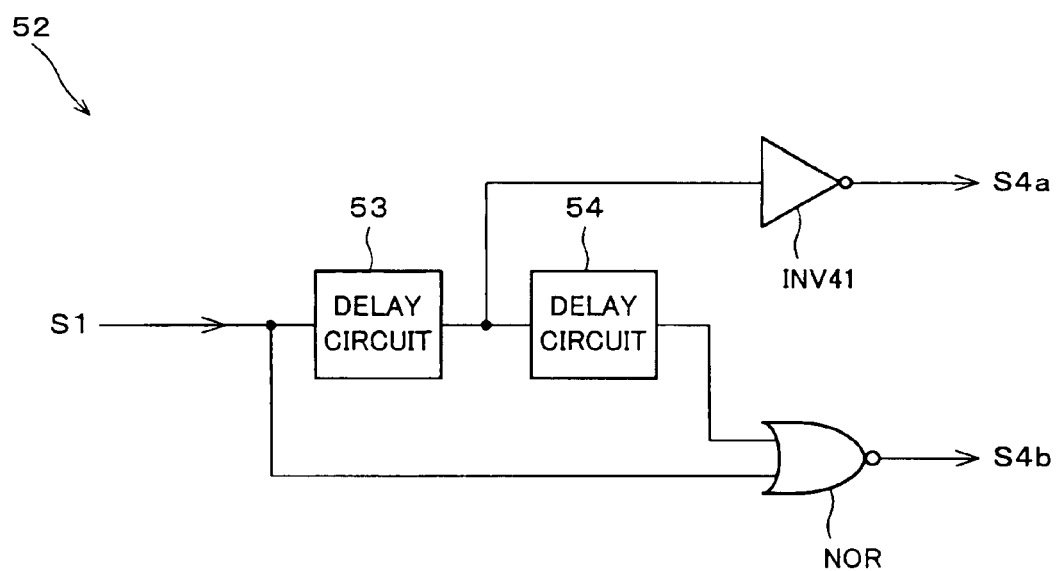
FIG. 9 is a block diagram showing a specific example of how a switch timing control circuit is arranged in the voltage conversion circuit shown in FIG. 8.
Figure 10:
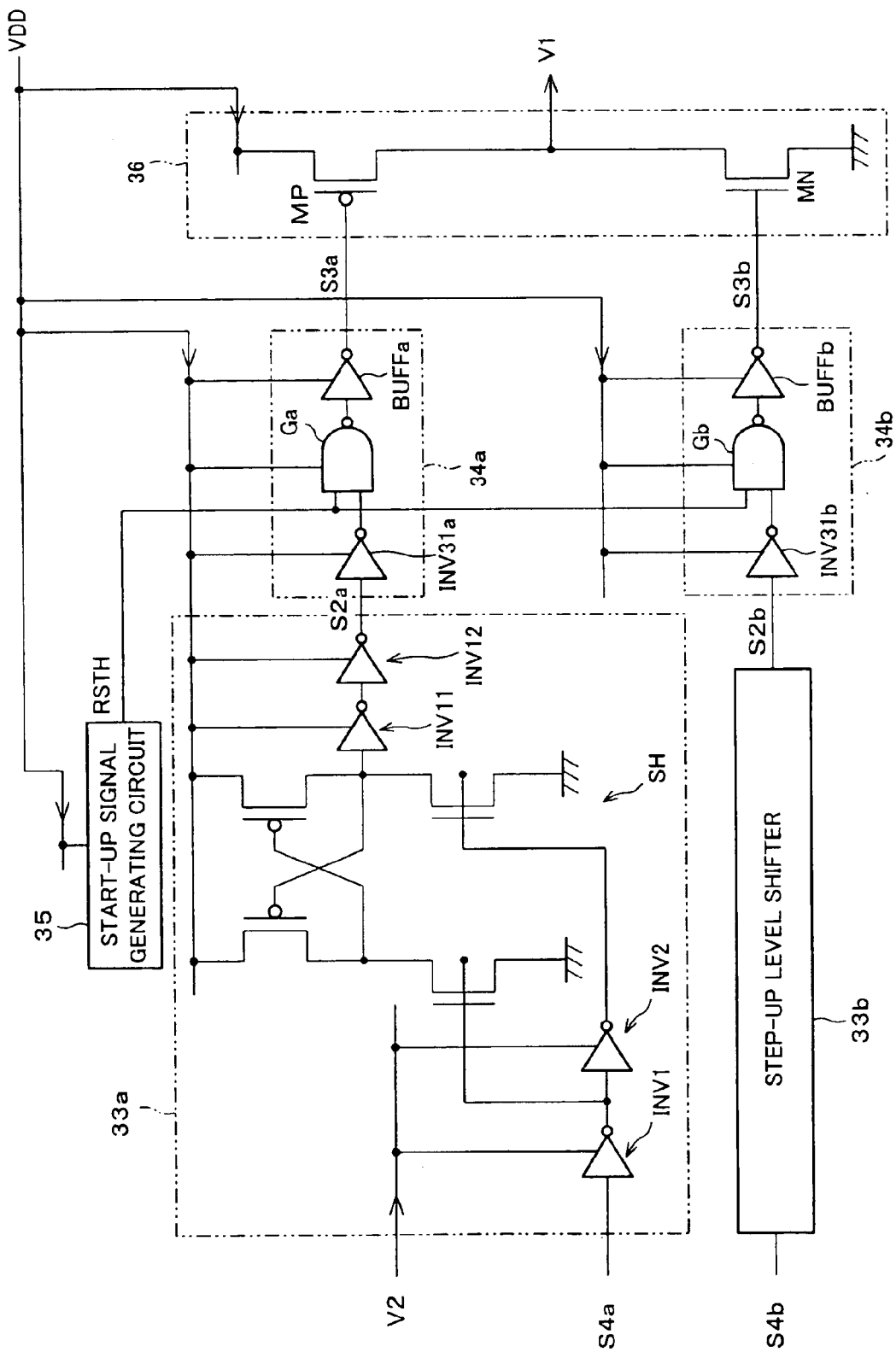
FIG. 10 is a block diagram showing a specific example of how a switch control circuit is arranged in the voltage conversion circuit shown in FIG. 8.

The following description will explain another embodiment of the present invention with reference to FIG. 8 to FIG. 10.

FIG. 8 is a block diagram showing an electric structure of a voltage conversion circuit 51 of another embodiment of the present invention. The voltage conversion circuit 51 is similar to the aforementioned voltage conversion circuit 31. The same reference sings are given to members corresponding to members of the voltage conversion circuit 31 with suffixes such as a or b added thereto, and description thereof is omitted.

It is noteworthy that: in the voltage conversion circuit 51, gates of the PMOS transistor MP and the NMOS transistor MN are respectively driven by output signals S3a and S3b outputted from switch control circuits 34a and 34b. Thus, while the PMOS transistor MP is ON, the NMOS transistor MN is turned OFF without fail, so that it is possible to suppress occurrence of a feedthrough current. As a result, it is possible to reduce the power consumption.

Thus, step-up level shifters 33a and 33b are provided so as to correspond to the switch control circuits 34a and 34b, and a switch timing control circuit 52 is provided. The switch timing control circuit 52 generates pulse signals S4a and S4b, which are first and second control signals respectively given to the step-up level shifters 33a and 33b, in accordance with the pulse signal S1 generated by the output pulse signal generating circuit 32.

FIG. 9 is a block diagram showing a specific example of how the switch timing control circuit 52 is arranged. The switch timing control circuit 52 includes two delay circuits 53 and 54, an inverter INV41, and a NOR circuit. The pulse signal S1 inputted from the output pulse signal generating circuit 32 is sequentially delayed by the delay circuits 53 and 54, and an output of the delay circuit 53 is inverted by the inverter INV41 so as to be outputted as a pulse signal S4a for the PMOS transistor MP. Further, either (i) the pulse signal S1 or (ii) an output of the delay circuit 54, which is the inverted logical sum (NOR), is outputted as a pulse signal S4b for the NMOS transistor MN.

The pulse signals S4a and S4b are respectively boosted by the step-up level shifters 33a and 33b, and thus boosted pulse signals S4a and S4b are given to the PMOS transistor MP and the NMOS transistor MN via the switch control circuits 34a and 34b.

The switch timing control circuit 52 includes the delay circuits 53 and 54, and the NOR circuit, wherein either (i) the pulse signal S1 or (ii) the output of the delay circuit 54, which is the inverted logical sum (NOR), is selected. Thus, between a period in which the PMOS transistor MP turns ON and a period in which the NMOS transistor MN turns ON, there is provided a period in which both the transistors turn OFF, i.e., a so-called dead time. Therefore, it is possible to suppress the feedthrough current brought about by simultaneously turning ON both the transistors when the switching condition changes, so that it is possible to further reduce the power consumption.

Each of the delay circuits 53 and 54 may be constituted of any circuit as long as the circuit has a function for delaying the inputted pulse signal S1.

FIG. 10 is a block diagram showing a specific example of how the switch control circuits 34a and 34b are arranged. As in the switch control circuit 34 shown in FIG. 4, the switch control circuit 34a includes an inverter INV31a, a NAND circuit Ga, and a buffer circuit BUFFa, and the switch control circuit 34b includes an inverter INV31b, a NAND circuit Gb, and a buffer circuit BUFFb.

Note that, the inverter INV41 causes the pulse signals S4a and S4b outputted from the switch timing control circuit 52 shown in FIG. 9 to have phases opposite to the inputted pulse signal S1. Thus, the step-up level shifters 33a and 33b are arranged so that: an input from the second-staged inverters INV1 and INV2 to the level shifter SH is inverted, and the pulse signals S2a and S2b are outputted with their phases inverted.

Of course, when a phase of an output signal of the switch timing control circuit 52 is the same as an input signal of the switch timing control circuit 52, signals having the same phase are outputted to the step-up level shifters 33a and 33b.

It is preferable to use each of the voltage conversion circuits 31 and 51 that are arranged in the foregoing manner as a step-down circuit for generating a driving voltage in the semiconductor integrated circuit device in accordance with an external power source voltage. Recently, with reduction of the power consumption of internal circuits constituting the semiconductor integrated circuit device, the step-down circuit's power consumption ratio in entire power consumption of the whole integrated circuit relatively increases.

Then, by using the voltage conversion circuits 31 and 51 as the step-down circuit, it is possible to reduce the power consumption of the step-down circuit itself. Thus, the reduction of the power consumption of internal circuits is not prevented, so that it is possible to contribute to the reduction of the power consumption of the whole semiconductor integrated circuit device.

Next, a semiconductor integrated circuit device including the voltage conversion circuit is described as follows.

Figure 11:
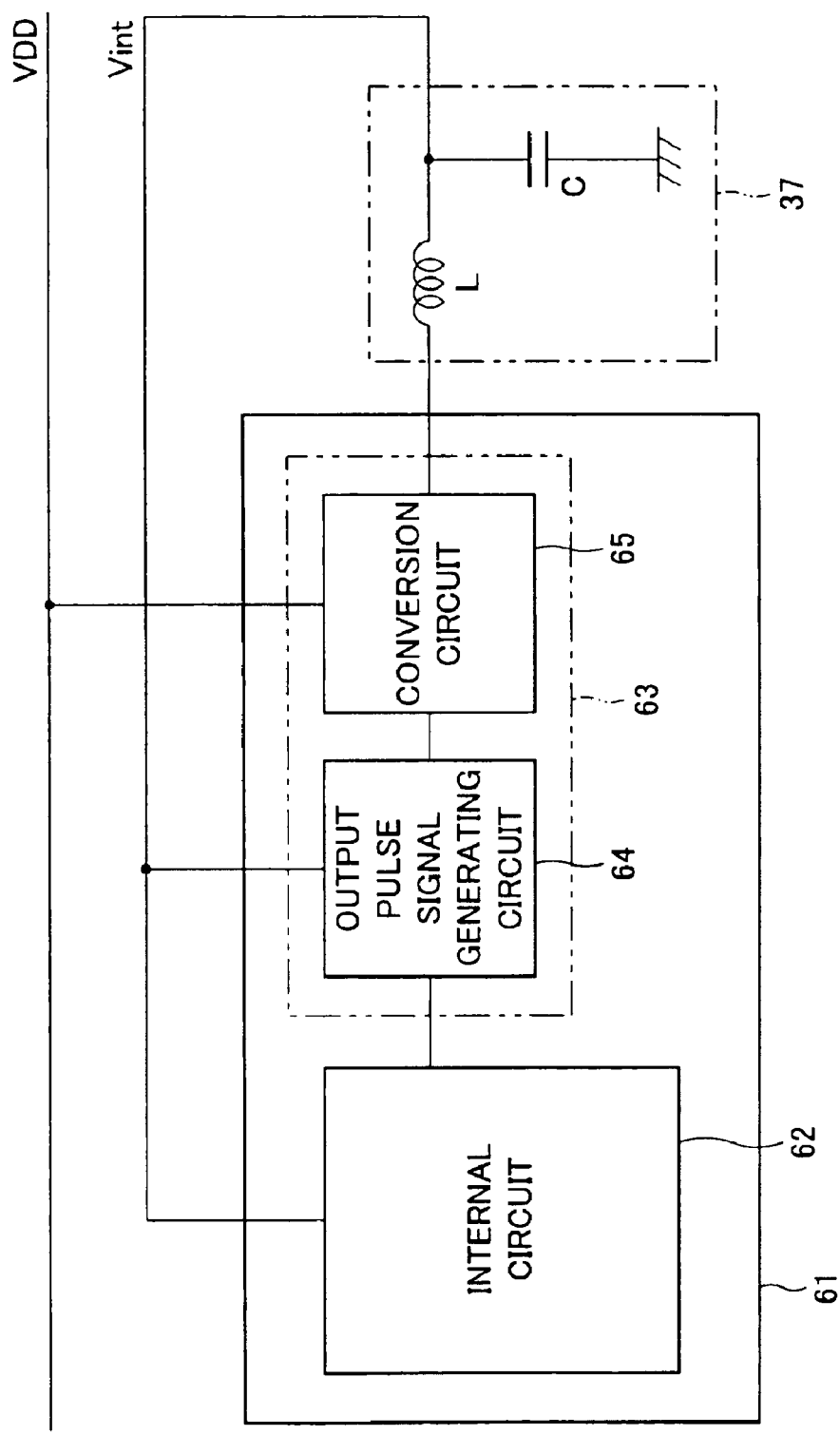
FIG. 11 is a block diagram showing an example of how a semiconductor integrated circuit device including the voltage conversion circuit is arranged.

As shown in FIG. 11, an integrated circuit 61 which is the semiconductor integrated circuit device includes an internal circuit 62 and a voltage conversion circuit 63 therein.

The internal circuit 62 is the integrated circuit 61's main circuit which is driven by a voltage Vint corresponding to the aforementioned output voltage V2. The voltage conversion circuit 63 corresponds to either the aforementioned voltage conversion circuit 31 or the aforementioned voltage conversion circuit 51, and includes an output pulse signal generating circuit 64 and a conversion circuit 65. The output pulse signal generating circuit 64 corresponds to the aforementioned output pulse signal generating circuit 32. The conversion circuit 65 is a circuit constituted of the circuits 33 to 36 of the voltage conversion circuit 31 shown in FIG. 1, or a circuit constituted of the circuits 33a, 33b, 34a, 35, and 52 of the voltage conversion circuit 51 shown in FIG. 8, and is operated by the power source voltage VDD.

In the integrated circuit 61, a pulsed voltage signal outputted from the conversion circuit 65 is smoothed by a filter circuit 37, and thus smoothed voltage signal is outputted as the voltage Vint. The voltage Vint is given to the internal circuit 62 and the output pulse signal generating circuit 64.

Further, a portable terminal including the semiconductor integrated circuit device is described as follows.

Figure 12:
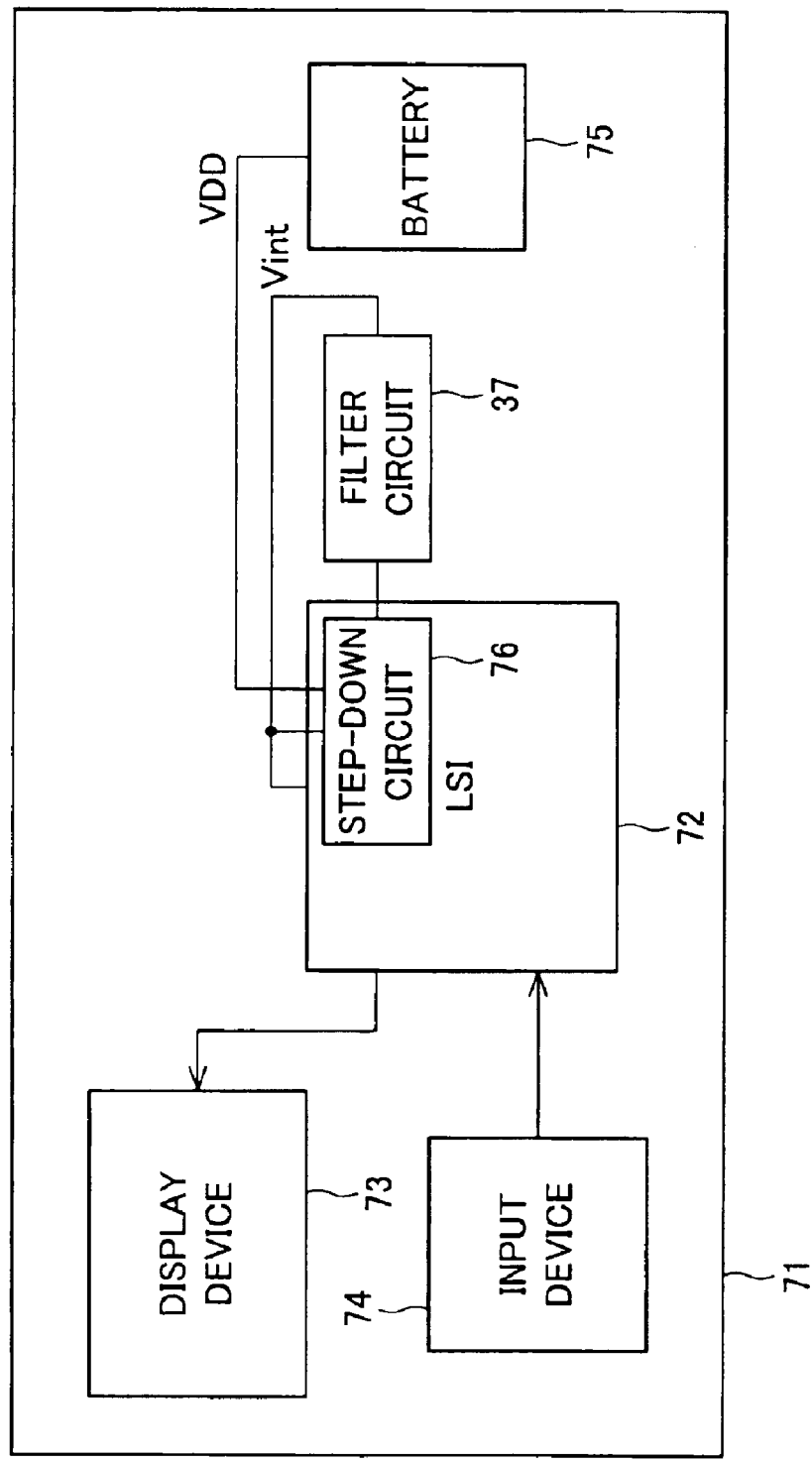
FIG. 12 is a block diagram showing an example of how a portable terminal including the semiconductor integrated circuit device is arranged.
Figure 13:
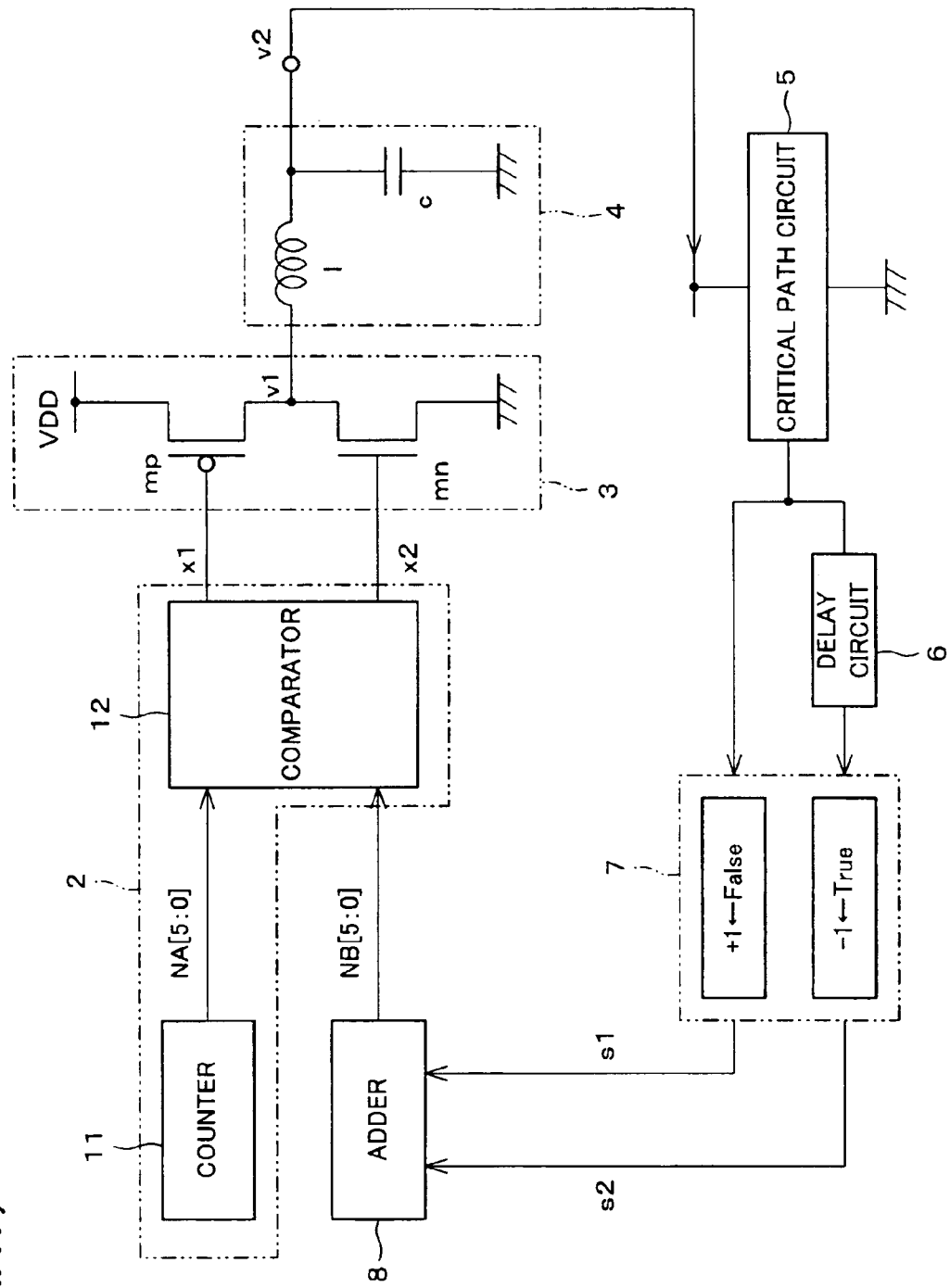
FIG. 13 is a diagram schematically showing a typical example of a conventional voltage conversion circuit.
Figure 14:
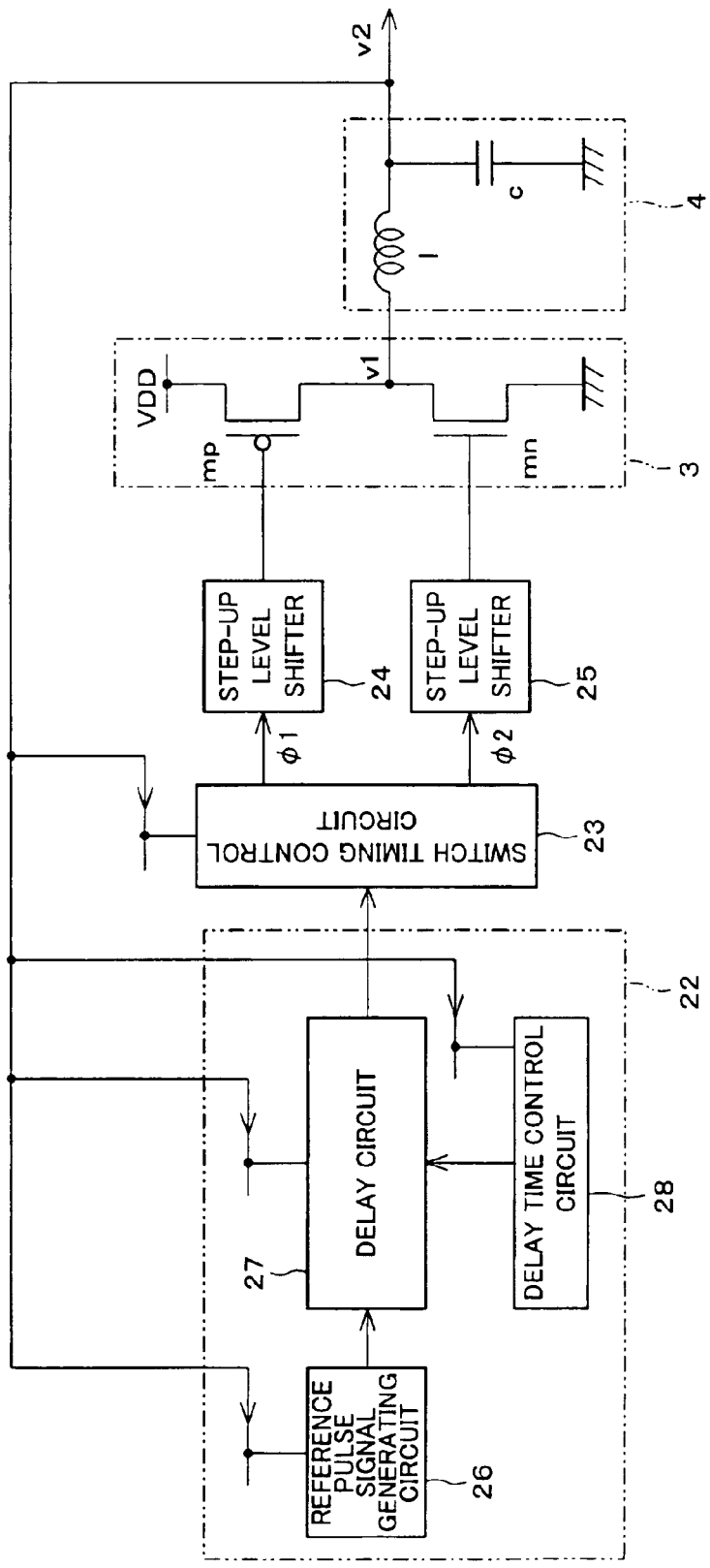
FIG. 14 is a diagram schematically showing a typical example of another conventional voltage conversion circuit.

As shown in FIG. 12, a portable terminal 71 includes an LSI 72, a display device 73, an input device 74, a battery 75, and a filter circuit 37 therein.

The LSI 72 is constituted of the aforementioned integrated circuit 61, and includes a circuit (for example, the aforementioned internal circuit 62) such as a signal processing circuit for giving a predetermined process to input data inputted by means of the input device 74 such as a key board so as to output thus processed data. Further, the LSI 72 includes a step-down circuit 76 constituted of the aforementioned voltage conversion circuit 63. The power source voltage VDD supplied from the battery 75 is decreased by the step-down circuit 76, and thus decreased voltage is smoothed by the filter circuit 37, so that the voltage is converted into the voltage Vint. The voltage Vint is given to the circuits in the LSI 72 and the output pulse signal generating circuit 64 of the step-down circuit 76 (voltage conversion circuit 63).

As described above, the voltage conversion circuit of each embodiment alternately controls ON/OFF of a P-type transistor and an N-type transistor that are provided in series between the power source lines, and causes a smoothing circuit to smooth an output voltage thereof, and outputs thus smoothed voltage as a power source voltage, and generates one or more pulse signals, each of which has a duty ratio for obtaining a desired output voltage, and uses the output voltage as a power source of a pulse signal generating circuit which supplies the pulse signals to control terminals of the two transistors, wherein a start-up control circuit forces the P-type transistor to turn ON during a predetermined period on start-up.

Therefore, the output voltage of the smoothing circuit is increased without fail, and the pulse signal generating circuit which uses the output voltage as its power source begins operating without fail, so that it is possible to obtain a desired output voltage. Thus, it is possible to realize a voltage conversion circuit in which the output voltage of the smoothing circuit is used as a power source of the pulse signal generating circuit so as to reduce the circuit size and the power consumption, and it is possible to realize sure start-up suitable for reducing the power consumption of the output voltage by means of the start-up control circuit.

Further, it is preferable to arrange the voltage conversion circuit so that the start-up control circuit includes: a start-up signal generating circuit for generating a start-up signal which has a predetermined voltage level during the predetermined period on start-up; and a switch control circuit, receiving the start-up signal and the pulse signal from the pulse signal generating circuit, which outputs a control signal whose voltage level causes the P-type transistor turn ON when the start-up signal has the predetermined voltage level, and outputs the pulse signal from the pulse signal generating circuit when the start-up signal does not have the predetermined voltage level.

According to the arrangement, it is possible to realize the start-up control circuit by making a simple arrangement.

Further, it is preferable to arrange the voltage conversion circuit so that the pulse signal generating circuit includes: a reference pulse signal generating circuit; a delay circuit for delaying the reference pulse signal, which has been inputted, for the predetermined period; and a delay time control circuit for setting a delay time of the delay circuit, said voltage conversion circuit further comprising a step-up level shifter for increasing a voltage level of an output pulse signal of the delay circuit.

According to the arrangement, even when the pulse signal generating circuit is operated by a lower voltage with an output voltage of the smoothing circuit used as a power source of the pulse signal generating circuit so as to reduce the circuit size and the power consumption, a pulse signal outputted by the step-up level shifter is increased, so that the two transistors can surely operate. Further, the circuit size of the pulse signal generating circuit is small, so that it is possible to reduce the power consumption.

Further, it is preferable to arrange the voltage conversion circuit so that the start-up control circuit generates the control signal as a first control signal and also generates a second control signal for forcing the N-type transistor to turn OFF so as to give the second control signal to the control terminal of the N-type transistor during the predetermined period on start-up.

According to the arrangement, the start-up control circuit forces the P-type transistor to turn ON and forces the N-type transistor to turn OFF in a corresponding manner, thereby controlling the two transistors of the switch circuit so as not to simultaneously turn ON. Thus, feedthrough current does not flow, so that it is possible to suppress an extra power consumption.

Further, it is preferable to arrange the voltage conversion circuit so that the start-up control circuit includes: a start-up signal generating circuit for generating a start-up signal having a predetermined voltage level during the predetermined period on start-up; a first switch control circuit, receiving the start-up signal and one of the pulse signals from the pulse signal generating circuit as a first pulse signal for the P-type transistor, which outputs a first control signal whose voltage level causes the P-type transistor turn ON when the start-up signal has the predetermined voltage level, and outputs the first pulse signal from the pulse signal generating circuit when the start-up signal does not have the predetermined voltage level; and a second switch control circuit, receiving the start-up signal and another of the pulse signals from the pulse signal generating circuit as a second pulse signal for the N-type transistor, which outputs a second control signal whose voltage level causes the N-type transistor turn ON when the start-up signal has the predetermined voltage level, and outputs the second pulse signal from the pulse signal generating circuit when the start-up signal does not have the predetermined voltage level.

According to the arrangement, it is possible to realize the start-up control circuit for forcing the P-type transistor to turn ON and forcing the N-type transistor to turn OFF on the start-up with a simple arrangement.

Further, it is preferable to arrange the voltage conversion circuit so that the pulse signal generating circuit includes: a reference pulse signal generating circuit; a delay circuit for delaying the reference pulse signal, which has been inputted, for the predetermined period; and a delay time control circuit for setting a delay time of the delay circuit, said voltage conversion circuit further comprising: a switch timing control circuit for generating the pulse signals as first and second pulse signals in accordance with an output pulse signal of the delay circuit; a first step-up level shifter for increasing a voltage level of the first pulse signal from the switch timing control circuit; and a second step-up level shifter for increasing a voltage level of the second pulse signal from the switch timing control circuit.

According to the arrangement, even when the pulse signal generating circuit is operated by a lower voltage with an output voltage of the smoothing circuit used as a power source of the pulse signal generating circuit so as to reduce the circuit size and the power consumption, the first and second pulse signals outputted by the first and second step-up level shifters are increased, so that the two transistors can surely operate. Further, the circuit size of the pulse signal generating circuit is small, so that it is possible to reduce the power consumption.

Further, in the semiconductor integrated circuit device, the voltage conversion circuit is used as a step-down circuit for generating a driving voltage of the semiconductor integrated circuit device in accordance with an external power source voltage.

Therefore, it is possible to reduce the power consumption of the step-down circuit itself. Thus, the reduction of the power consumption of internal circuits is not prevented, so that it is possible to contribute to the reduction of the power consumption of the whole semiconductor integrated circuit device.

Recently, with reduction of the power consumption of internal circuits constituting the semiconductor integrated circuit device, the step-down circuit's power consumption ratio in entire power consumption of the whole integrated circuit relatively increases. Then, by using the voltage conversion circuits arranged in the foregoing manner as the step-down circuit for generating a driving voltage of the semiconductor integrated circuit device in accordance with an external power source voltage, it is possible to reduce the power consumption of the step-down circuit itself. Thus, the reduction of the power consumption of internal circuits is not prevented, so that it is possible to contribute to the reduction of the power consumption of the whole semiconductor integrated circuit device.

Further, recently, a driving time of the portable terminal is required to be longer. Then, by using the semiconductor integrated circuit device having the voltage conversion circuit arranged in the foregoing manner as a signal processing LSI or the like in a portable terminal, it is possible to contribute the reduction of the power consumption of the whole portable terminal.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A voltage conversion circuit, comprising:
   a switch circuit arranged so that a series circuit constituted of a P-type transistor and an N-type transistor is provided between a pair of power source lines in series;
   a smoothing circuit for smoothing an output voltage derived from a junction of the P-type transistor and the N-type transistor of the switch circuit;
   a pulse signal generating circuit for generating one or more pulse signals, each of which has a duty ratio for obtaining a desired output voltage, by using the output voltage smoothed by the smoothing circuit as a power source, so as to give the pulse signal to a control terminal of the P-type transistor and a control terminal of the N-type transistor;
   a start-up control signal for generating a control signal which forces the P-type transistor to turn ON and giving the control signal to the control terminal of the P-type transistor during a predetermined period on start-up.

2. The voltage conversion circuit as set forth in claim 1, wherein the start-up control circuit includes:
   a start-up signal generating circuit for generating a start-up signal which has a predetermined voltage level during the predetermined period on start-up; and
   a switch control circuit, receiving the start-up signal and the pulse signal from the pulse signal generating circuit, which outputs a control signal whose voltage level causes the P-type transistor turn ON when the start-up signal has the predetermined voltage level, and outputs the pulse signal from the pulse signal generating circuit when the start-up signal does not have the predetermined voltage level.

3. The voltage conversion circuit as set forth in claim 1, wherein the pulse signal generating circuit includes:
   a reference pulse signal generating circuit for generating a reference pulse signal in accordance with the output voltage from the smoothing circuit;
   a delay circuit for delaying the reference pulse signal, which has been inputted, for the predetermined period; and
   a delay time control circuit for setting a delay time of the delay circuit,
   said voltage conversion circuit further comprising a step-up level shifter for increasing a voltage level of an output pulse signal of the delay circuit.

4. The voltage conversion circuit as set forth in claim 2, wherein the pulse signal generating circuit includes:
   a reference pulse signal generating circuit for generating a reference pulse signal in accordance with the output voltage from the smoothing circuit;
   a delay circuit for delaying the reference pulse signal, which has been inputted, for the predetermined period; and
   a delay time control circuit for setting a delay time of the delay circuit,
   said voltage conversion circuit further comprising a step-up level shifter for increasing a voltage level of an output pulse signal of the delay circuit.

5. The voltage conversion circuit as set forth in claim 1, wherein the start-up control circuit generates the control signal as a first control signal and also generates a second control signal for forcing the N-type transistor to turn OFF so as to give the second control signal to the control terminal of the N-type transistor during the predetermined period on start-up.

6. The voltage conversion circuit as set forth in claim 4, wherein the start-up control circuit includes:
   a start-up signal generating circuit for generating a start-up signal having a predetermined voltage level during the predetermined period on start-up;
   a first switch control circuit, receiving the start-up signal and one of the pulse signals from the pulse signal generating circuit as a first pulse signal for the P-type transistor, which outputs a first control signal whose voltage level causes the P-type transistor turn ON when the start-up signal has the predetermined voltage level, and outputs the first pulse signal from the pulse signal generating circuit when the start-up signal does not have the predetermined voltage level; and
   a second switch control circuit, receiving the start-up signal and another of the pulse signals from the pulse signal generating circuit as a second pulse signal for the N-type transistor, which outputs a second control signal whose voltage level causes the N-type transistor turn ON when the start-up signal has the predetermined voltage level, and outputs the second pulse signal from the pulse signal generating circuit when the start-up signal does not have the predetermined voltage level.

7. The voltage conversion circuit as set forth in claim 5, wherein the pulse signal generating circuit includes:
   a reference pulse signal generating circuit for generating a reference pulse signal in accordance with the output voltage from the smoothing circuit;
   a delay circuit for delaying the reference pulse signal, which has been inputted, for the predetermined period; and
   a delay time control circuit for setting a delay time of the delay circuit,
   said voltage conversion circuit further comprising:
   a switch timing control circuit for generating the pulse signals as first and second pulse signals in accordance with an output pulse signal of the delay circuit;
   a first step-up level shifter for increasing a voltage level of the first pulse signal from the switch timing control circuit; and
   a second step-up level shifter for increasing a voltage level of the second pulse signal from the switch timing control circuit.

8. The voltage conversion circuit as set forth in claim 6, wherein the pulse signal generating circuit includes:
   a reference pulse signal generating circuit for generating a reference pulse signal in accordance with the output voltage from the smoothing circuit;
   a delay circuit for delaying the reference pulse signal, which has been inputted, for the predetermined period; and
   a delay time control circuit for setting a delay time of the delay circuit,
   said voltage conversion circuit further comprising:
   a switch timing control circuit for generating the first and second pulse signals in accordance with an output pulse signal of the delay circuit;

a first step-up level shifter for increasing a voltage level of the first pulse signal from the switch timing control circuit; and a second step-up level shifter for increasing a voltage level of the second pulse signal from the switch timing control circuit.

9. A semiconductor integrated circuit device, comprising a voltage conversion circuit including:

a switch circuit arranged so that a series circuit of a P-type transistor and an N-type transistor is provided in series between a pair of power source lines;

a smoothing circuit for smoothing an output voltage derived from a junction of the P-type transistor and the N-type transistor of the switch circuit;

a pulse signal generating circuit for generating one or more pulse signals, each of which has a duty ratio for obtaining a desired output voltage, by using the output voltage smoothed by the smoothing circuit as a power source, so as to give the pulse signal to a control terminal of the P-type transistor and a control terminal of the N-type transistor; and a start-up control signal for generating a control signal which forces the P-type transistor to turn ON and giving the control signal to the control terminal of the P-type transistor during a predetermined period on start-up.

10. The semiconductor integrated circuit device as set forth in claim 9, wherein the start-up control circuit includes:

a start-up signal generating circuit for generating a start-up signal which has a predetermined voltage level during the predetermined period on start-up; and a switch control circuit, receiving the start-up signal and the pulse signal from the pulse signal generating circuit, which outputs a control signal whose voltage level causes the P-type transistor turn ON when the start-up signal has the predetermined voltage level, and outputs the pulse signal from the pulse signal generating circuit when the start-up signal does not have the predetermined voltage level.

11. The semiconductor integrated circuit device as set forth in claim 9, wherein the pulse signal generating circuit includes:

a reference pulse signal generating circuit for generating a reference pulse signal in accordance with the output voltage from the smoothing circuit;

a delay circuit for delaying the reference pulse signal, which has been inputted, for the predetermined period; and a delay time control circuit for setting a delay time of the delay circuit, said voltage conversion circuit further comprising a step-up level shifter for increasing a voltage level of an output pulse signal of the delay circuit.

12. The semiconductor integrated circuit device as set forth in claim 10, wherein the pulse signal generating circuit includes:

a reference pulse signal generating circuit for generating a reference pulse signal in accordance with the output voltage from the smoothing circuit;

a delay circuit for delaying the reference pulse signal, which has been inputted, for the predetermined period; and a delay time control circuit for setting a delay time of the delay circuit, said voltage conversion circuit further comprising a step-up level shifter for increasing a voltage level of an output pulse signal of the delay circuit.

13. The semiconductor integrated circuit device as set forth in claim 9, wherein the start-up control circuit generates the control signal as a first control signal and also generates a second control signal for forcing the N-type transistor to turn OFF so as to give the second control signal to the control terminal of the N-type transistor during the predetermined period on start-up.

14. The semiconductor integrated circuit device as set forth in claim 13, wherein the pulse signal generating circuit includes:

a start-up signal generating circuit for generating a start-up signal having a predetermined voltage level during the predetermined period on start-up;

a first switch control circuit, receiving the start-up signal and one of the pulse signals from the pulse signal generating circuit as a first pulse signal for the P-type transistor, which outputs a first control signal whose voltage level causes the P-type transistor turn ON when the start-up signal has the predetermined voltage level, and outputs the first pulse signal from the pulse signal generating circuit when the start-up signal does not have the predetermined voltage level; and a second switch control circuit, receiving the start-up signal and another of the pulse signals from the pulse signal generating circuit as a second pulse signal for the N-type transistor, which outputs a second control signal whose voltage level causes the N-type transistor turn ON when the start-up signal has the predetermined voltage level, and outputs the second pulse signal from the pulse signal generating circuit when the start-up signal does not have the predetermined voltage level.

15. The semiconductor integrated circuit device as set forth in claim 13, wherein the pulse signal generating circuit includes:

a reference pulse signal generating circuit for generating a reference pulse signal in accordance with the output voltage from the smoothing circuit;

a delay circuit for delaying the reference pulse signal, which has been inputted, for the predetermined period; and a delay time control circuit for setting a delay time of the delay circuit, said voltage conversion circuit further comprising:

a switch timing control circuit for generating the pulse signals as first and second pulse signals in accordance with an output pulse signal of the delay circuit;

a first step-up level shifter for increasing a voltage level of the first pulse signal from the switch timing control circuit; and a second step-up level shifter for increasing a voltage level of the second pulse signal from the switch timing control circuit.

16. The semiconductor integrated circuit device as set forth in claim 14, wherein the pulse signal generating circuit includes:

a reference pulse signal generating circuit for generating a reference pulse signal in accordance with the output voltage from the smoothing circuit;

a delay circuit for delaying the reference pulse signal, which has been inputted, for the predetermined period; and a delay time control circuit for setting a delay time of the delay circuit, said voltage conversion circuit further comprising:

a switch timing control circuit for generating the first and second pulse signals in accordance with an output pulse signal of the delay circuit;

a first step-up level shifter for increasing a voltage level of the first pulse signal from the switch timing control circuit; and a second step-up level shifter for increasing a voltage level of the second pulse signal from the switch timing control circuit.

17. The semiconductor integrated circuit device as set forth in claim 9, wherein the voltage conversion circuit is used as a step-down circuit for generating a driving voltage of the semiconductor integrated circuit device in accordance with an external power source voltage.

18. The semiconductor integrated circuit device as set forth in claim 13, wherein the voltage conversion circuit is used as a step-down circuit for generating a driving voltage of the semiconductor integrated circuit device in accordance with an external power source voltage.

19. A portable terminal, comprising the semiconductor integrated circuit device as set forth in claim 9.

20. A portable terminal, comprising the semiconductor integrated circuit device as set forth in claim 13.

* * * * *